United States Patent

Iwatani

[11] Patent Number: 5,089,766
[45] Date of Patent: Feb. 18, 1992

[54] VEHICLE AC GENERATOR CONTROL DEVICE WITH OVERVOLTAGE LIMITER AND DUMMY LOAD UNIT

[75] Inventor: Shiro Iwatani, Hyogo, Japan

[73] Assignee: Mitsubishi Denki K.K., Tokyo, Japan

[21] Appl. No.: 551,344

[22] Filed: Jul. 12, 1990

[30] Foreign Application Priority Data

Jul. 13, 1989 [JP] Japan .................................. 1-180954

[51] Int. Cl.$^5$ .............................................. H02J 7/14
[52] U.S. Cl. ........................................ 322/25; 322/28; 322/99; 361/21; 320/64
[58] Field of Search ................. 322/28, 29, 25, 27, 322/59, 90, 91, 94, 95, 99; 361/20, 21, 91; 320/64

[56] References Cited

U.S. PATENT DOCUMENTS

| | | | |
|---|---|---|---|
| 4,349,854 | 9/1982 | Mori et al. | 361/21 |
| 4,438,384 | 3/1984 | Akita et al. | 322/99 X |
| 4,629,966 | 12/1986 | Quantz | 322/25 |
| 4,658,200 | 4/1987 | Kouge | 322/25 |
| 4,739,245 | 4/1988 | Komurasaki et al. | 322/99 |
| 4,752,865 | 6/1988 | Hatakeyama et al. | 363/89 |
| 4,755,737 | 7/1988 | Komurasaki et al. | 322/99 |
| 4,812,732 | 3/1989 | Iwatani | 322/99 |

Primary Examiner—Steven L. Stephan
Assistant Examiner—Kristine Peckman
Attorney, Agent, or Firm—Sughrue, Mion, Zinn, Macpeak & Seas

[57] ABSTRACT

A vehicle AC generator control device includes an AC generator including a field coil; a rectifier for rectifying an AC output of the AC generator; a battery connected to an output terminal of the rectifier; a voltage regulator including a switching element series-connected to the field coil, the voltage regulator detecting a terminal voltage of the rectifier or battery to operate the switching element to control a field current of the field coil to adjust an output voltage of the generator to a predetermined value; a dummy load unit including a dummy load balanced with an output capacity of the AC generator; and an overvoltage limiter which detects when the output voltage of the AC generator exceeds a set value, to energize the dummy load unit, so that the dummy load unit is connected to an output terminal of the rectifier, to thereby suppress any abnormal rise of the output voltage.

5 Claims, 2 Drawing Sheets

VEHICLE AC GENERATOR CONTROL DEVICE WITH OVERVOLTAGE LIMITER AND DUMMY LOAD UNIT

BACKGROUND OF THE INVENTION

This invention relates to a control device for a vehicle AC generator.

One example of a conventional control device for a vehicle AC generator is as shown in FIG. 2. In the case of the control device shown in FIG. 2, an AC generator 1 has an armature coil 101 and a field coil 102. A rectifier 2 for rectifying AC output voltages is connected to the AC generator 1. The rectifier 2 has a main output terminal 201, an auxiliary output terminal 202, and a ground terminal 203. One end of the field coil 102 is connected to a voltage regulator 3. The voltage regulator 3 comprises: voltage division resistors 301 and 302 for voltage detection; a control transistor 304 whose base electrode is connected through a Zener diode 303 to the connecting point of the two voltage division resistors 301 and 302; a power transistor 305 which is controlled by the transistor 304; a resistor 306; a suppression diode 307; and an initial exciting resistor 308.

The main output terminal 201 of the rectifier 2 is connected to a battery 4. The other end of the field coil 102 is connected to the auxiliary output terminal 202 of the rectifier 2, and it is further connected through the initial exciting resistor 308 and a key switch 5 to the positive terminal of the battery 4. A display lamp 6 is disposed in parallel with the initial exciting resistor 308.

The positive terminal of the battery 4 is connected through a load switch 8 to a vehicle electrical load 7.

The conventional control device thus designed operates as follows: When the key switch 5 is turned on, an initial exciting current flows in the field coil 102 through the parallel circuit of the display lamp 6 and the initial exciting resistor 308, so that the display lamp 6 is turned on. When the field current flows and the generator 1 is driven, a power generation is carried out, so that AC voltage is induced across the armature coil 101. As a result, the potential difference across the display lamp 6 becomes 0 V, so that the latter 6 is turned off.

The AC voltage induced in the armature coil 101 is rectified by the rectifier 2 and applied to the battery 4 to charge the latter 4. If, in this operation, the output voltage of the generator 1 is lower than a predetermined value, the voltage provided by the voltage division resistors 301 and 302 is also low. Accordingly, the Zener diode 303 is non-conductive, and the controlling transistor is also non-conductive, so that the power transistor is conductive. As a result, the field current flowing in the field coil 102 is increased, and the output voltage of the generator 1 is increased accordingly. When, on the other hand, the output voltage of the generator 1 is higher than the predetermined value, the voltage provided by the voltage division resistors 301 and 302 is also high. Hence, the Zener diode is rendered conductive, and the controlling transistor 304 is also rendered conductive, so that the power transistor 305 is rendered non-conductive. Therefore, the field current is decreased, and the output voltage of the generator 1 is decreased accordingly. The above-described operations are repeatedly carried out until the output voltage of the generator 1 reaches the predetermined value. The suppression diode 307 absorbs the surge induced on the field coil 102.

When, in the above-described conventional device, the power transistor 305 is short-circuited, or the end of the field coil 102 which is to be controlled in an on-off mode is grounded with metallic foreign matter or the like, the on-off control of the field current cannot be performed any longer, so that the field current is allowed to flow continuously. As a result, the output voltage of the generator 1 is raised abnormally high, and the battery is charged excessively. The display lamp 6 gives no alarm for this abnormal condition. If this over-charging occurs during high speed operation, and lasts for a long time, then a large quantity of hydrogen gas is produced from the battery electrolyte which in the worst case may explode the battery at worst. During driving of the vehicle at night, the excessively high voltage may burn out the filaments of the head lamps, thus making it impossible to drive the vehicle. In addition, the excessively high voltage may break the engine controlling computer, thus making it impossible to control the engine.

SUMMARY OF THE INVENTION

Accordingly, an object of this invention is to eliminate the above-described difficulties accompanying a conventional control device for a vehicle AC generator. More specifically, an object of the invention is to prevent a vehicle electrical load including a battery from being damaged when a vehicle AC generator outputs abnormally high voltages as its control means becomes out of order.

A vehicle AC generator control device, according to the invention, comprises: a dummy load unit with a dummy load balanced with the output capacity of the AC generator; and an overvoltage limiter which detects when the output voltage of the AC generator exceeds a set value, to energize the dummy load unit so that the dummy load is connected to the output terminal of the rectifier, to thereby suppress the abnormal rise of the output voltage.

When the voltage regulator becomes out of order, so that the output voltage of the generator is increased to an abnormally high value exceeding the set value, the overvoltage limiter operates to energize the dummy load unit, so that the dummy load is connected to the rectifier. The capacity of the dummy load is so selected to be in balance with the output capacity of the generator. Therefore, upon connection of the dummy load, the amount of surplus output voltage is consumed thereby, to suppress the abnormal rise of the output voltage.

DETAILED DESCRIPTION OF THE INVENTION

Figure 1:
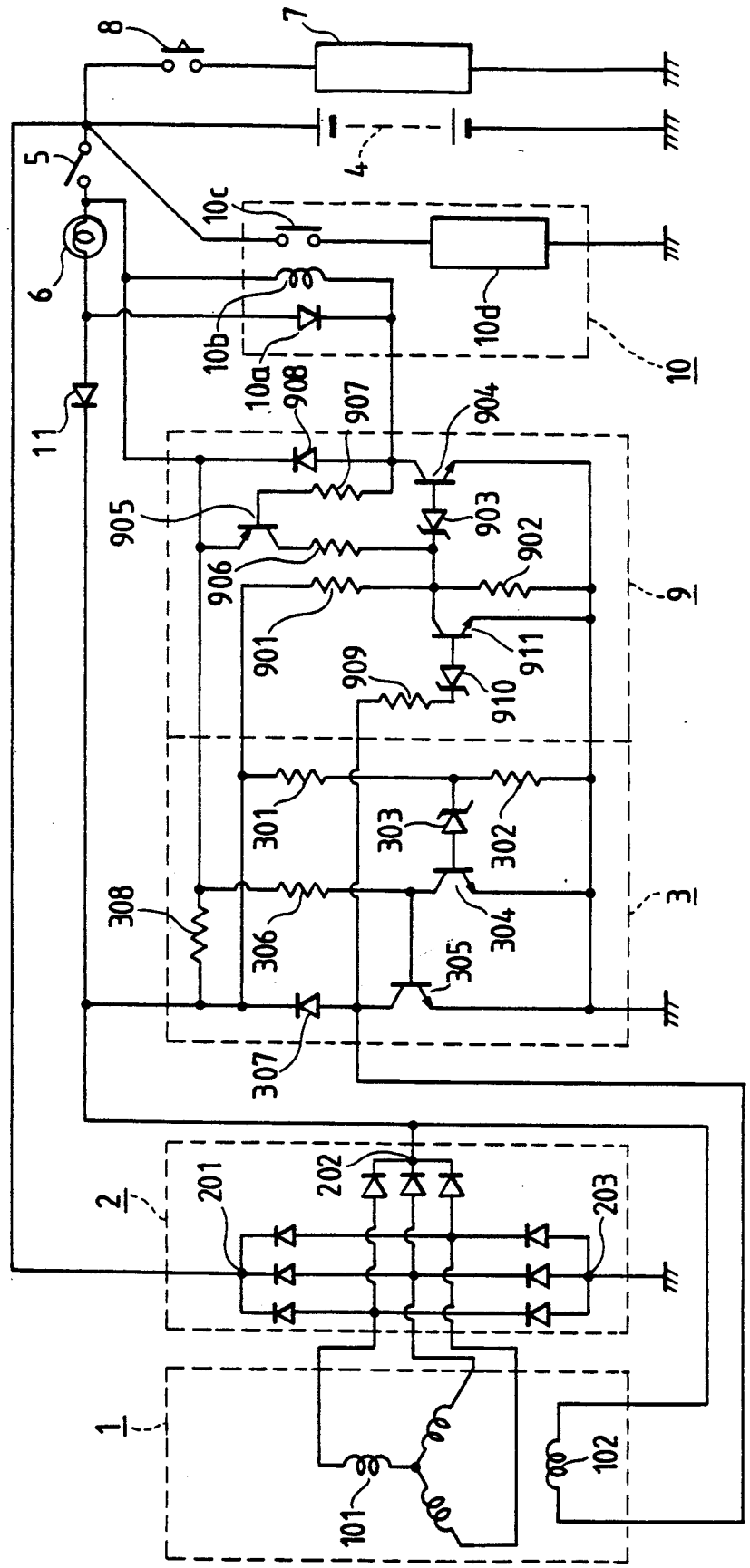
FIG. 1 is a circuit diagram showing one example of a control device for a vehicle AC generator according to this invention.
Figure 2:
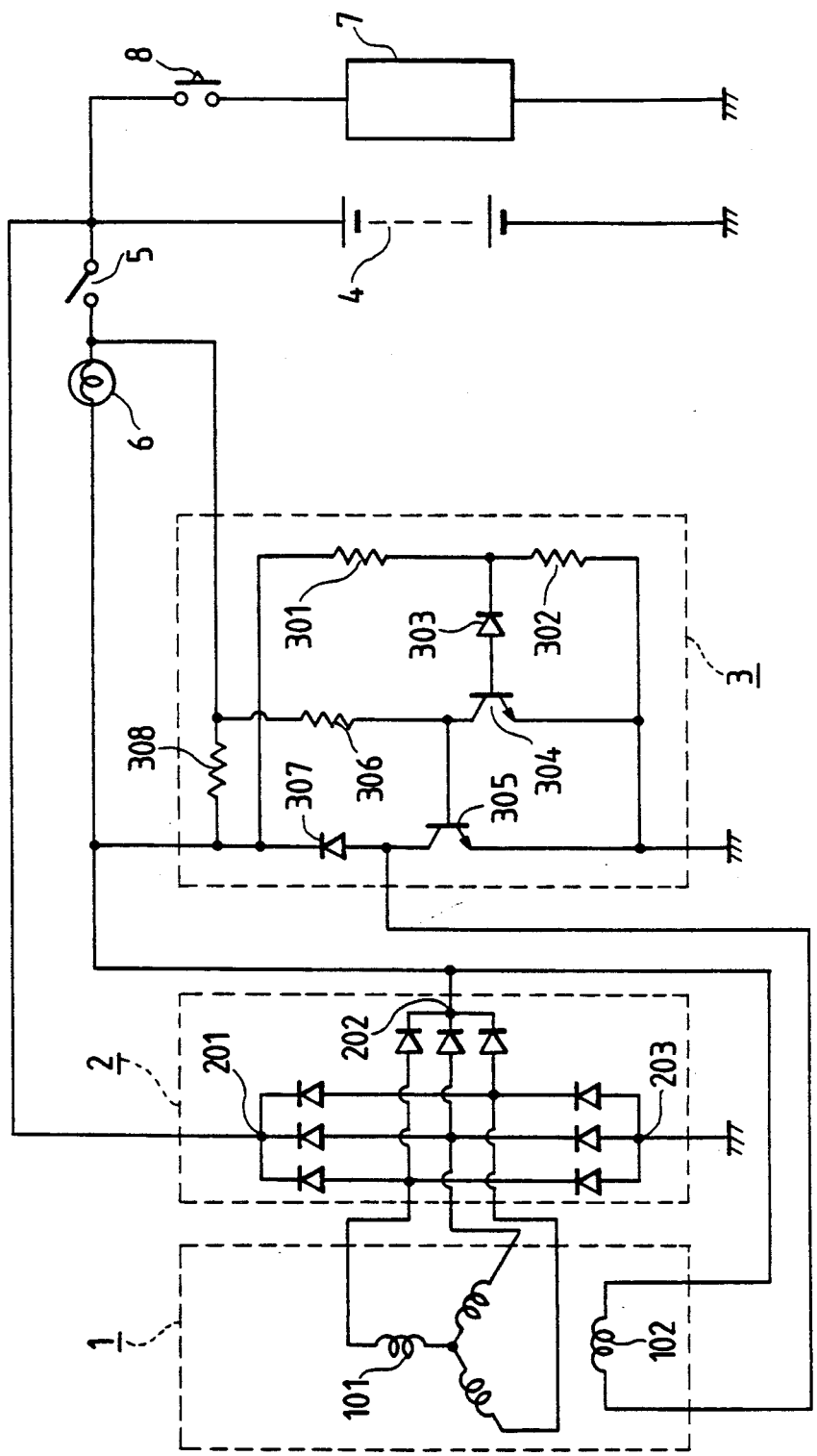
FIG. 2 is a circuit diagram showing a conventional control device for a vehicle AC generator.

FIG. 1 is a circuit diagram showing one example of a control device a vehicle AC generator according to this invention.

As shown in FIG. 1, an AC generator 1 comprises an armature coil 101 and a field coil 102, and is connected to a rectifier 2. The rectifier 2 has a main output terminal 201, an auxiliary output terminal 202, and a ground terminal 203. The main output terminal 201 is connected to a battery 4. One end of the field coil 102 is connected to a voltage regulator 3, which comprises: voltage division resistors 301 and 302; a control transistor 304 whose base is connected through a Zener diode 303 to the connecting points of the voltage division resistors 301 and 302: a power transistor 305 which is controlled by the control transistor 304; a resistor 306; a suppression diode 307; and an initial exciting resistor 308. The other end of the field coil 102 is connected to the auxiliary output terminal 202, and through the initial exciting resistor 308 and a key switch 5 to the positive terminal of the battery 4. A display lamp 6 is provided in parallel with the initial exciting resistor 308. A vehicle electrical load 7 is connected through a load switch 8 to the positive terminal of the battery 4.

The auxiliary output terminal 202 of the rectifier 2 is connected to an overvoltage limiter 9. The latter comprises: voltage division resistors 901 and 902 for output voltage detection; a Zener diode 903 connected to the connecting point of the voltage division resistors 901 and 902; an output transistor 904 whose base is connected to the Zener diode 903; and a hold circuit consisting of a transistor 905 and resistors 906 and 907. The collector of the output transistor 904 is connected to a diode 908. The overvoltage limiter 9 further comprises a transistor 911 whose base is connected through a resistor 909 and a Zener diode 910 to the collector of the power transistor 305 of the voltage regulator 3. The collector of the transistor 911 is connected to the connecting point of the voltage division resistors 901 and 902.

The control device further includes a dummy load unit 10, which comprises: a diode 10a for applying current to a display lamp 6; a coil member 10b for operating contact means 10c; the contact means 10c being closed when the coil member 10b is energized; and a dummy load 10d connected to the positive terminal (output end of the generator) of the battery 4 through the contact means 10c. The diode 10a and the coil member 10b of the dummy load unit 10 are connected to the collector of the output transistor 904. In FIG. 1, reference numeral 11 designates a reverse blocking diode.

The operation of the control device thus constructed will be described.

In the control device, the operation from switching the key switch 5 to the electric power generation, and the voltage regulating operation are the same as those in the above-described conventional control device.

Let us consider the case where the power transistor 305 in the voltage regulator 3 is short-circuited, or the end of the field coil 102 which is to be controlled in an on-off mode is grounded; that is, the voltage regulator 3 does not work, so that the output voltage of the generator 1 is raised to an abnormally high level. In this case, the voltage at the auxiliary output terminal 202 of the rectifier 2 is detected by the voltage division resistors 901 and 902. When the output voltage exceeds the set value which is determined by the voltage division resistors 901 and 902 and the Zener diode, the latter is rendered conductive, whereby the transistor 904 is rendered conductive to energize the coil member in the dummy load unit 10. As a result, the contact means 10c of the dummy load unit 10 is closed, so that the dummy load 10d is connected to the output terminal of the generator. The capacity of the dummy load is so selected to be in balance with the output capacity of the generator 1. Hence, the surplus electric power is consumed by dummy load 10d, so that the abnormal rise of the voltage is prevented. At the same time, current is applied to the display lamp 6 through the diode 10a, so that the display lamp 6 is turned on to give an alarm to the driver of the abnormal condition. When the output transistor 904 of the overvoltage limiter 9 is rendered conductive, then a base current flows in the transistor 905 forming the hold circuit, so that the transistor 905 is rendered conductive. Hence, the division voltage is increased with the aid of the resistor 906 connected to the collector of the transistor 905, as a result of which the Zener diode 903 is rendered conductive, whereby the output transistor 904 is held conductive. This holding operation lasts until the key switch 5 is turned off.

When a large vehicle electric load is disconnected, the power transistor 305 of the voltage regulator 3 is non-conductive, so that its collector potential is high. This high potential is detected by the resistor 909 and the Zener diode 910 of the overvoltage limiter 9, so that the transistor 911 connected to the Zener diode 910 is rendered conductive, whereby the voltage dividing function of the voltage division resistors 901 and 902 is made ineffective. This eliminates the erroneous connection of the dummy load 10 when such a load is disconnected.

As was described above, the control device of the invention is so designed that, when the output voltage of the generator is exceeds the predetermined value because the voltage regulator does not work, the abnormally high voltage is detected by the logic means in association with the operating condition of the voltage regulator, so that the dummy load balanced with the output capacity of the generator is connected to the output terminal of the rectifier, whereby the abnormal rise of the output voltage is prevented. This will prevent the occurrences of serious difficulties such as excessively charging the battery, burning out the head lamps, etc. Thus, when the generator outputs abnormally high voltages, the control device of the invention operates as a security means to perform a protecting and warning function with high accuracy.

What is claimed is:

1. A vehicle AC generator control device, comprising:

an AC generator including a field coil,
a rectifier for rectifying an AC output of said AC generator;
a battery connected to an output terminal of said rectifier;
a voltage regulator including a switching element series-connected to said field coil, said voltage regulator operating said switching element to control a field current of said field coil to adjust an output voltage of said generator to a predetermined value;
a dummy load unit including a dummy load balanced with an output capacity of said AC generator; and
an overvoltage limiter which detects when said output voltage of said AC generator exceeds a set value, and energizes said dummy load unit, so that said dummy load unit is connected to an output terminal of said rectifier, to thereby suppress an abnormal rise of said output voltage.

2. A vehicle AC generator control device as claimed in claim 1, wherein said dummy load unit further includes a diode for applying current to a display lamp, a contact means, and a coil member for operating said contact means, said contact means being closed when said coil member is energized so that said dummy load of said dummy load unit is connected to said output terminal of said rectifier.

3. A vehicle AC generator control device as claimed in claim 2, wherein said overvoltage limiter includes first and second voltage division resistors for detecting an output voltage at said output terminal of said rectifier, a first Zener diode connected to a connecting point of said first and second voltage division resistors so as to set said set value, and a first output transistor whose base is connected to said first Zener diode, said first output transistor energizing said coil member of said dummy load unit when said output voltage detected by said first and second voltage division resistors exceeds said set value.

4. A vehicle AC generator control device as claimed in claim 3, wherein said overvoltage limiter further includes a hold circuit comprising a second transistor and third and fourth resistors connected to said first output transistor and said first Zener diode, respectively, said hold circuit maintaining the conductive state of said first output transistor.

5. A vehicle AC generator control device as claimed in claim 4, wherein said overvoltage limiter further includes a third transistor whose base is connected to said switching element of said voltage regulator through a second Zener diode and a fifth resistor, said third transistor being rendered conductive when said switching element of said voltage regulator is non-conductive so that said dummy load unit is not connected to said rectifier.

* * * * *